US009692840B2

(12) United States Patent
Fushman et al.

(10) Patent No.: US 9,692,840 B2
(45) Date of Patent: Jun. 27, 2017

(54) SYSTEMS AND METHODS FOR MONITORING AND APPLYING STATISTICAL DATA RELATED TO SHAREABLE LINKS ASSOCIATED WITH CONTENT ITEMS STORED IN AN ONLINE CONTENT MANAGEMENT SERVICE

(71) Applicant: Dropbox, Inc., San Francisco, CA (US)

(72) Inventors: Ilya Fushman, Palo Alto, CA (US); Nils Peter Welinder, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 59 days.

(21) Appl. No.: 14/077,166

(22) Filed: Nov. 11, 2013

(65) Prior Publication Data
US 2015/0134808 A1    May 14, 2015

(51) Int. Cl.
*H04L 29/08* (2006.01)
*G06Q 30/02* (2012.01)
*G06F 17/30* (2006.01)
*G06F 15/173* (2006.01)

(52) U.S. Cl.
CPC ............ *H04L 67/22* (2013.01); *G06Q 30/02* (2013.01); *G06F 17/30873* (2013.01)

(58) Field of Classification Search
CPC .. G06Q 20/102; G06Q 30/02; G06F 17/3089; G06F 17/30; G06F 17/30873; G06K 9/6218; H04L 67/22
USPC ............................. 709/224; 705/40; 707/741
See application file for complete search history.

(56) References Cited

U.S. PATENT DOCUMENTS

| | | | |
|---|---|---|---|
| 4,888,681 A | 12/1989 | Barnes | |
| 7,264,157 B2 | 9/2007 | Ishizuka | |
| 7,899,829 B1 * | 3/2011 | Malla | 707/741 |
| 2006/0184997 A1 | 8/2006 | La Rotonda et al. | |
| 2007/0157072 A1 * | 7/2007 | LaBiche | 715/501.1 |

(Continued)

FOREIGN PATENT DOCUMENTS

| | | | |
|---|---|---|---|
| WO | WO 2007072371 A2 * | 6/2007 | |
| WO | 2009/038258 A1 | 3/2009 | |
| WO | 2012/150602 A1 | 11/2012 | |

OTHER PUBLICATIONS

Box; "Manage Shared Files Quickly and Easily,"; 2013; located at https://www.box.com/business/secure-file-sharing/; last visited on Mar. 13, 2013; 3 pages.

(Continued)

*Primary Examiner* — David Lazaro
*Assistant Examiner* — Zi Ye
(74) *Attorney, Agent, or Firm* — Hickman Palermo Becker Bingham LLP

(57) ABSTRACT

Shareable links can be created to share content items and information pertaining to activity on those shareable links can be monitored and stored in an online content management service. Based on this activity information, predetermined actions can be executed. These actions can include sending notifications regarding link activity, disabling shareable links, and/or updating sharing limitations related to the shareable links. Using the activity information, popular shared content items can be identified and recommendations for sharing unshared content items can be provided to the user. Additionally, advertisements can be tailored to the relative popularity of the shared content items.

16 Claims, 9 Drawing Sheets

(56) References Cited

U.S. PATENT DOCUMENTS

| | | |
|---|---|---|
| 2007/0276862 A1* | 11/2007 | Toutonghi ......... G06F 17/30017 |
| 2008/0189294 A1* | 8/2008 | Cha ................................ 707/10 |
| 2008/0281622 A1 | 11/2008 | Hoal |
| 2009/0125391 A1* | 5/2009 | Toutonghi ....................... 705/14 |
| 2009/0150340 A1* | 6/2009 | Lhuillier ........... G06F 17/30867 |
| 2009/0234876 A1* | 9/2009 | Schigel ............. G06F 17/30873 |
| 2009/0282052 A1 | 11/2009 | Evans et al. |
| 2010/0287033 A1 | 11/2010 | Mathur |
| 2011/0188742 A1* | 8/2011 | Yu et al. ....................... 382/159 |
| 2012/0023375 A1 | 1/2012 | Dutta et al. |
| 2012/0054666 A1 | 3/2012 | Baird-Smith et al. |
| 2012/0180107 A1* | 7/2012 | Gammill et al. ................. 726/3 |
| 2012/0209724 A1 | 8/2012 | Wayne |
| 2012/0215684 A1 | 8/2012 | Kidron |
| 2012/0239489 A1 | 9/2012 | Peretti |
| 2012/0278127 A1 | 11/2012 | Kirakosyan et al. |
| 2014/0129942 A1 | 5/2014 | Rathod |
| 2014/0196100 A1* | 7/2014 | Alexandersson ...... H04H 60/46 725/109 |
| 2015/0135337 A1 | 5/2015 | Fushman et al. |

OTHER PUBLICATIONS

Springshare; "LibGuides. Powerful Features Without Compromising Ease-of-Use,"; 2012; located at http://springshare.com/libguides/features.html; last visited on Mar. 13, 2013; 2 pages.

Fushman, U.S. Appl. No. 14/077,160, filed Nov. 11, 2013, Final Office Action, Jan. 5, 2017.

\* cited by examiner

300

| USER SHARE HISTORY | |
|---|---|
| SHAREABLE LINK A 302 | URL A |
| NAME 304 | Content Item Name |
| TYPE 306 | File extension/type |
| VIEW METRIC 308 | View Count/CTR/Other Metric |
| ACTIVITY THRESHOLDS 310 | Predefined limitations |
| SHARING TARGETS 312 | User and/or Group Identifiers |
| REQUEST DATA 313 | Time/date/location and IDs |

314

| USER SHARE NETWORK | |
|---|---|
| DIRECT 316 | Target Identifiers |
| RESHARE 318 | Reshare User Identifiers |
| | Reshare Target Identifiers |

320

| BOOKMARKS | | |
|---|---|---|
| SHAREABLE LINK 322 | USER IDENTIFIER 324 | SORTABLE METRIC 326 |
| Link A | User 1 | View Count: N |
| Link B | User 2 | Label: Important |

*FIG. 3*

SYSTEMS AND METHODS FOR MONITORING AND APPLYING STATISTICAL DATA RELATED TO SHAREABLE LINKS ASSOCIATED WITH CONTENT ITEMS STORED IN AN ONLINE CONTENT MANAGEMENT SERVICE

BACKGROUND

The present disclosure relates generally to online content management services and in particular to monitoring statistical data related to shared content stored in an online content management service and using the statistical data to provide additional features and/or services to users.

Online content management services allow users to access and manage content across multiple devices using the Internet. Online content management services typically also enable users to share content with other persons, both members and non-members of the online content management services. In a typical online content management service, a user establishes an account with the service provider and associates various content items with the account. For example, some online content management services can allow the user to store content items (including but not limited to text documents; email messages; text messages; other types of messages; media files such as photos, videos, and audio files; and/or folders containing multiple files) and to selectively allow other users to access the content items. Content items can be stored in a master repository maintained by the service provider and mirrored to or synchronized with local copies on various user devices.

Online content management services can monitor sharing activity and based on that activity provide additional features and/or services.

SUMMARY

Certain embodiments of the present invention relate to monitoring activity on shareable links created for content items (including but not limited to text documents; email messages; text messages; other types of messages; media files such as photos, videos, and audio files; and/or folders containing multiple files) stored in an online content management service and providing features and/or services based on that activity. In some embodiments, content items can be shared through the online content management service to other recipient users and/or groups by creating shareable links for the content items. The shareable links can be shared with recipient users and/or groups through the online content management service and/or through other communications media such as email, instant message, text, etc. The online content management service can monitor activity on each shareable link, e.g., requests to download a content item received through a shareable link. Shareable link data can be stored in one or more data structures. In some embodiments the shareable link data can include the data related to the monitored activity, the sharing user's history of creating shareable links, bookmarked shareable links, and each user's share network.

In some embodiments, the online content management service can execute actions based on the shareable link data. These actions can include sending notifications regarding link activity, disabling shareable links, and/or updating activity thresholds related to the shareable links. Recommendations for sharing unshared content items can be generated based on a user's share history. For example, previously shared content items which received more activity than a threshold value can be monitored, and similar unshared content items can be identified and a sharing recommendation can be generated. In some embodiments, the sharing recommendation can include a recommendation of particular members of a user's share network with whom to share the unshared content item.

In some embodiments, the online content management service can serve advertisements in response to requests to download a shared content item using a shareable link. The advertisements can each be associated with an advertising rate determined based on a user's share history. Additionally, or alternatively, the advertising rate for an advertisement on a particular shareable link can be increased or decreased dynamically depending on the activity monitored on that shareable link.

The following detailed description together with the accompanying drawings will provide a better understanding of the nature and advantages of the present invention.

BRIEF DESCRIPTION OF THE DRAWINGS

FIG. 3 shows data structures in which data related to shareable links can be stored, in accordance with an embodiment of the present invention.

DETAILED DESCRIPTION

Figure 1:
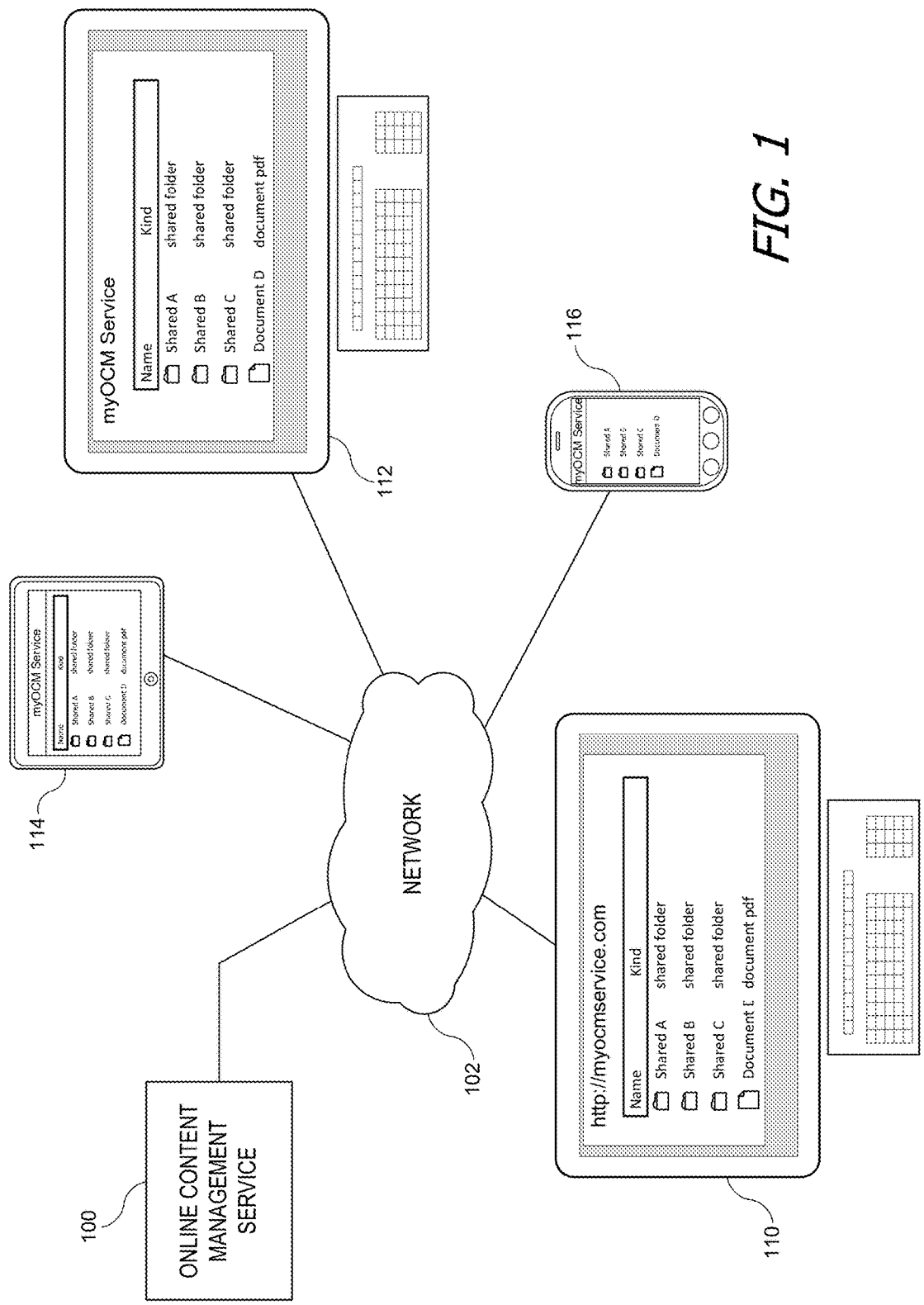
FIG. 1 shows clients accessing an online content management service according to an embodiment of the present invention.

Online content management services can enable users to access their content items from any internet-connected device. As described above, these services enable users to share their content items with other users including both members and non-members of the services. One way of sharing content items is by creating shareable links which can be easily shared with recipient users. A shareable link is a uniform resource locator (URL) that can be used to download a content item stored in an online content management service. The shareable link can be share with other users through the online content management service, or through other communication channels such as email, text message, instant message, etc. When a recipient user follows a shareable link in an internet browser on a client device, the recipient user can be shown a download page from which the content item can be downloaded. In some embodiments, when the recipient user follows the shareable link, a download can be initiated directly without first displaying a download page.

Online content management services can collect data related to activity received through shareable links to improve the user experience by providing additional features and/or services to the user. For example, a shareable link's activity can be monitored and reported to the user who created the shareable link. This provides an increased level of control to the sharing user by enabling the sharing user to identify when and how often shared content items are downloaded. This enables the sharing user to e.g., more readily identify if a shareable link has been shared with more people than expected, or determine that a content item has been mistakenly shared. In some embodiments, identity information corresponding to recipient users who download a content item can be reported.

To protect user privacy, when a recipient user requests to download a shared content item using a shareable link, the recipient user can receive a notification that the shareable link's activity is being monitored. The notification can enable the recipient user to cancel the request without any potentially identifying information being collected and/or recorded. In some embodiments, reported activity information can indirectly identify recipient users who have downloaded a content item using a shareable link, e.g., when a content item is shared with a limited number of recipient users. To address this concern, in some embodiments, activity information can be reported in aggregate after a number of requests have been received to obscure user-specific data which may be used to identify a particular recipient user.

Certain embodiments of the present invention relate to monitoring activity on shareable links created for content items (including but not limited to text documents; email messages; text messages; other types of messages; media files such as photos, videos, and audio files; and/or folders containing multiple files) stored in an online content management service and providing features and/or services based on that activity. In some embodiments, content items can be shared through the online content management service to other users and/or groups by creating a shareable links for the content items. The shareable links can be shared with recipient users and/or groups through the online content management service and/or through other communications media such as email, instant message, text, etc. The online content management service can monitor activity on each shareable link, e.g., requests to download a content item received through a shareable link. Shareable link data can be stored in one or more data structures. In some embodiments the shareable link data can include the data related to the monitored activity, the sharing user's history of creating shareable links, bookmarked shareable links, and the sharing user's share network.

In some embodiments, the online content management service can execute actions based on the shareable link data. These actions can include sending notifications regarding link activity, disabling shareable links, and/or updating activity thresholds related to the shareable links. Recommendations for sharing unshared content items can be generated based on a user's share history. For example, previously shared content items which received more activity than a threshold value can be monitored, and similar unshared content items can be identified and a sharing recommendation can be generated. In some embodiments, the sharing recommendation can include a recommendation of particular members of a user's share network with whom to share the unshared content item.

In some embodiments, the online content management service can serve advertisements in response to requests to download a shared content item using a shareable link. The advertisements can each be associated with an advertising rate determined based on a sharing user's share history. Additionally, or alternatively, the advertising rate for an advertisement on a particular shareable link can be increased or decreased dynamically depending on the activity monitored on that shareable link.

FIG. 1 shows clients accessing an online content management service 100 according to an embodiment of the present invention. Online content management service 100 can include, for example, a file storage service, a file sharing service, a social media service that allows users to post messages and/or other content, and so on. Online content management service 100 can be hosted on servers maintained by a service provider and accessed via a network 102, such as the Internet.

Users can access online content management service 100 by operating various clients 110, 112, 114, 116. As used herein, a "client" refers generally to a combination of computer hardware and software that enables a user to interact with online content management service 100. For example, client 110 can be a desktop or laptop computer executing a web browser (e.g., Internet Explorer, Google Chrome, or Safari) that communicates with online content management service 100 using web protocols such as HTTP (Hypertext Transfer Protocol). Client 112 can be a desktop or laptop computer executing an application program provided by the provider of online content management service 100. In some instances where the online content management service provides access to files, the application program can allow files hosted on a server to appear to exist within a filesystem structure associated with the client computer's operating system. It should be noted that in some instances the same client computer can execute both a web browser and a desktop application program; accordingly, it is to be understood that a single physical device can implement one or more clients. In some embodiments, a when a user accesses online content management service 100 using a client, the user can authorize the client with the user's account. A user account can store a record of each client that is authorized with the user account, including identifying information from the client such as an IP address, MAC address, phone number, or other information. Authorizing a device with a user account can enable faster and/or simplified access to online content management service 100, client notifications, and other features.

Other examples of clients include mobile devices, e.g., tablet computer 114 and mobile phone 116, which can execute application programs (also referred to as "apps") that communicate with online content management service 100. At various times, a user can be interacting with one or more of clients 110, 112, 114, 116.

In some embodiments, online content management service 100 can allow users to selectively share content items stored in the online content management service 100 with other users, including members and non-members of the online content management service 100. One way of sharing content items is by creating shareable links. A user can select a content item and create a shareable link (e.g., including a uniform resource locator, or URL) for that content item. The shareable link can then be shared through online content management service 100 and/or through different communication media, such as instant message, email, SMS, and other similar channels. A content item for which a sharable link is created is accessible to whoever is given the shareable link. In some embodiments, the online content management service can include an interface for sending shareable links for content items. A sharing user can provide target identifiers corresponding to those persons or groups to whom the shareable link is to be sent. The target identifiers can include email addresses, membership identifiers associated with the online content management service, or other similar identifier. In accordance with an embodiment, a shareable link for a folder can enable a recipient user following the shareable link to access the content items within the folder.

In some embodiments, the online content management service can analyze the target identifiers received from a sharing user to determine whether any of the target identifiers correspond to a member of the online content management service. For example, the sharing user can provide an email address for a recipient who is also a member of the online content management service. The online content management service can identify members by comparing the target identifiers to email addresses used by members when they joined. For those target identifiers that correspond to members of the online content management service, notifications that include the shareable link can be sent to client devices through the online content management service. For example, a notification can be stored in a member's user account. When the member next accesses online content management service 100, the notification can be displayed to the member. In some embodiments, the notification can be pushed to authorized clients and displayed on the client device. In some embodiments, the notification can be sent in addition to an email that includes the shareable link. In other embodiments, the notification can be sent instead of the email.

Figure 2:
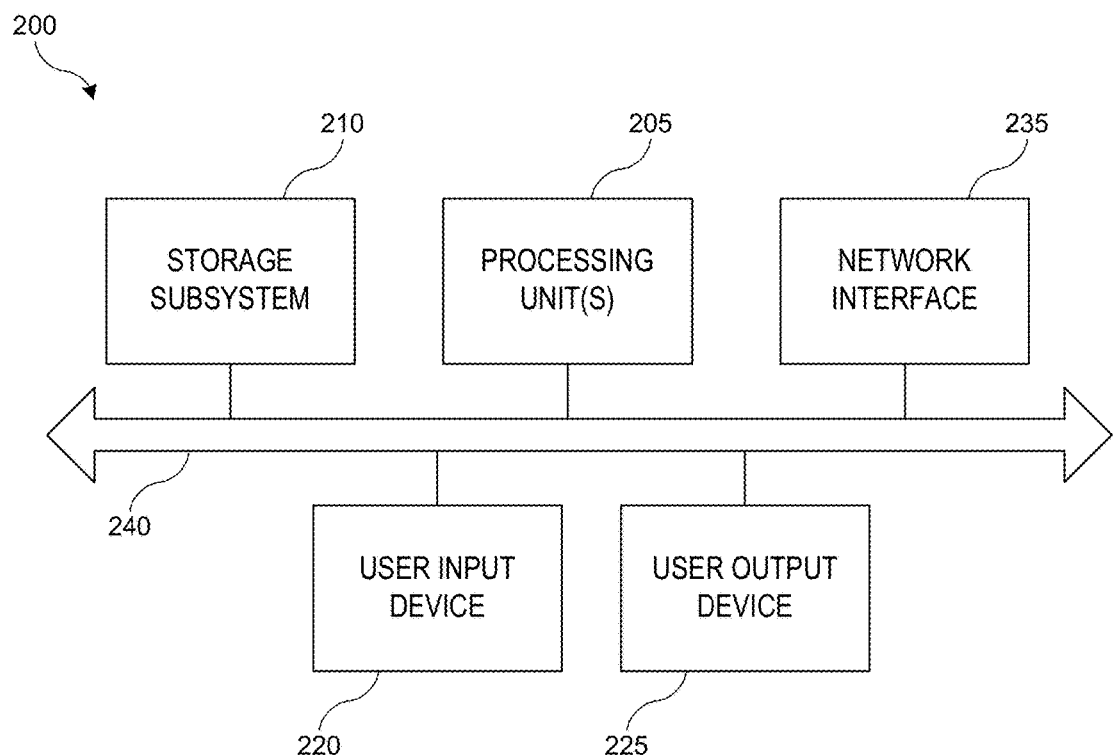
FIG. 2 is a simplified block diagram illustrating a representative computer system.

Various operations described herein can be implemented on computer systems, which can be of generally conventional design. FIG. 2 is a simplified block diagram illustrating a representative computer system 200. In various embodiments, computer system 200 or similar systems can implement a client (e.g., any of platforms 110, 112, 114, 116) or a server (e.g., server 200).

Computer system 200 can include processing unit(s) 205, storage subsystem 210, input devices 220, output devices 225, network interface 235, and bus 240.

Processing unit(s) 205 can include a single processor, which can have one or more cores, or multiple processors. In some embodiments, processing unit(s) 205 can include a general-purpose primary processor as well as one or more special-purpose co-processors such as graphics processors, digital signal processors, or the like. In some embodiments, some or all processing units 205 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 205 can execute instructions stored in storage subsystem 210.

Storage subsystem 210 can include various memory units such as a system memory, a read-only memory (ROM), and a permanent storage device. The ROM can store static data and instructions that are needed by processing unit(s) 205 and other modules of electronic device 200. The permanent storage device can be a read-and-write memory device. This permanent storage device can be a non-volatile memory unit that stores instructions and data even when computer system 200 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 205 need at runtime.

Storage subsystem 210 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 210 can store one or more software programs to be executed by processing unit(s) 205, such as an operating system, a browser application, a mobile app for accessing an online content management service, a desktop application for accessing the online content management service, and so on. "Software" refers generally to sequences of instructions that, when executed by processing unit(s) 205 cause computer system 200 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 205. Software can be implemented as a single program or a collection of separate programs or program modules that interact as desired. From storage subsystem 210, processing unit(s) 205 can retrieve program instructions to execute and data to process in order to execute various operations described herein.

A user interface can be provided by one or more user input devices 220 and one or more user output devices 225. Input devices 220 can include any device via which a user can provide signals to computing system 200; computing system 200 can interpret the signals as indicative of particular user requests or information. In various embodiments, input devices 220 can include any or all of a keyboard, touch pad, touch screen, mouse or other pointing device, scroll wheel, click wheel, dial, button, switch, keypad, microphone, and so on.

User output devices 225 can include any device via which computer system 200 can provide information to a user. For example, user output devices 225 can include a display to display images generated by computing system 200. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 225 can be provided in addition to or instead of a display. Examples include indicator lights, speakers, tactile "display" devices, printers, and so on.

Network interface 235 can provide voice and/or data communication capability for computer system 200. In some embodiments, network interface 235 can include radio frequency (RF) transceiver components for accessing wireless voice and/or data networks (e.g., using cellular telephone technology, advanced data network technology such as 3G, 4G or EDGE, WiFi (IEEE 802.11 family standards), or other mobile communication technologies, or any combination thereof), GPS receiver components, and/or other components. In some embodiments, network interface 235 can provide wired network connectivity (e.g., Ethernet) in addition to or instead of a wireless interface. Network interface 235 can be implemented using a combination of hardware (e.g., antennas, modulators/demodulators, encoders/decoders, and other analog and/or digital signal processing circuits) and software components.

Bus 240 can include various system, peripheral, and chipset buses that communicatively connect the numerous components of computing system 200. For example, bus 240 can communicatively couple processing unit(s) 205 with storage subsystem 210. Bus 240 can also connect to input devices 220 and output devices 225. Bus 240 can also couple computing system 200 to a network through network interface 235. In this manner, computing system 200 can be a part of a network of multiple computer systems (e.g., a local area network (LAN), a wide area network (WAN), an intranet, or a network of networks, such as the Internet).

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 205 can provide various functionality for computing device 200. For example, in a mobile computing device, processing unit(s) 205 can execute an operating system and an app to communicate with online content management service 100. In a desktop computing device, processing unit(s) 205 can execute an operating system and a desktop application program that presents an interface to online content management service 100; in some embodiments, this interface can be integrated with an interface to a filesystem maintained by the operating system. In some embodiments, processing unit(s) 205 can execute a browser application that provides the ability to retrieve and display content items from sources such as online content management service 100 (e.g., using HTTP or other data transfer protocols to retrieve and display web pages) and the ability to receive and interpret user input pertaining to the content items, such as selection of an item to view, submission of data by the user in response to a particular content item (e.g., filling out a form on an interactive web page), and so on.

It will be appreciated that computer system 200 is illustrative and that variations and modifications are possible. Computer system 200 can have other capabilities not specifically described here (e.g., mobile phone, global positioning system (GPS), power management, one or more cameras, various connection ports for connecting external devices or accessories, etc.). Further, while computer system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

As described above, shareable link data can be stored in one or more data structures from which it can be used to provide an improved user experience. FIG. 3 shows data structures in which data related to shareable links can be stored, in accordance with an embodiment of the present invention. Data structure 300 represents a user share history. Online content management service 100 can maintain a user share history for each member. As shown in FIG. 3, user share history 300 can include details for each shareable link created by a user. Although a single shareable link, shareable link A 302, is shown in user share history 300, it will be understood that user share history 300 can include data for multiple shareable links. User share history 300 can include a copy of the shareable link URL, e.g., shareable link A 302 corresponds to URL A. In some embodiments, the shareable link URL can be a short URL created using a URL shortening service. User share history 300 can include name 304 and type 306 of the shared content item. Type 306 can include the shared content item's file extension or type if the content item is a folder.

In some embodiments, activity on the shareable link can be stored in view metric 308. For example, view metric 308 can include a view count that increments each time a request to access the shareable link is received, a click-through-rate (CTR) for advertisements associated with the shareable link, time stamps for requests received using the shareable link, etc. In some embodiments, view metric 308 can include a reshare count that increments each time a shareable link is reshared by a recipient user through online content management service 100. Activity thresholds 310 can include limitations that are set when the shareable link is created. These limitations can include a view count limit, a bandwidth limit, and/or a temporal limit, as well as privacy features configured by the sharing user or set by online content management service 100. When a request for a content item is received by online content management service 100 using a shareable link, online content management service 100 can compare view metric data 308 to activity thresholds data 310 to determine whether to allow access to the content item. As is discussed further below, the activity thresholds can be used to trigger one or more actions related to the shareable link. For example, these actions can include reporting shareable link activity, disabling the shareable link, or other actions.

Sharing targets 312 can include target identifiers, such as user and/or group identifiers, to which the shareable link has been sent. As described above, a shareable link can be shared directly through online content management service 100 and/or through other communications channels. Online content management service can populate sharing targets 312 with those target identifiers to which the shareable link was sent through online content management service 100. In some embodiments, however, online content management service 100 does not populate sharing targets 312 with target identifiers to which the shareable link was sent via other channels. As such, sharing targets 312 may provide an incomplete list of target identifiers to which a shareable link has been sent. When a request is received for the content item using the shareable link, a user identifier associated with the request can be compared to sharing targets 312 and, if the user identifier is not included, can be added to sharing targets 312. As more requests are received using the shareable link, sharing targets 312 will represent a more complete list of target identifiers to which the shareable link was sent.

In some embodiments, user share history 300 can include request data field 313. Request data field 313 can include data for each request received to access a content item associated with a shareable link. The data can include a time and date of the request, an IP from which the request was received, and other data related to the request. In some embodiments, location information can be included in request data field. The location data can be derived from the IP address or included with the request. If the request is received from a member of online content management service 100, a user identifier associated with the request can also be stored in request data 313.

Data structure 314 represents a user's share network. Online content management service 100 can maintain user share network 314 data structure for each member. User share network 314 can include direct field 316 including each target identifier to which a shareable link has been sent by the sharing user. In some embodiments direct field 316 can be populated based on user share history 300 by extracting the user and/or group identifiers included in each shareable link's sharing targets field 312. The target identifiers included in direct field 316 represent a first level share network for the sharing user. In some embodiments, a recipient user who receives a shareable link from another user can reshare the shareable link by sending it to additional target identifiers through online content management service 100. Reshare 318 can include reshare user identifiers corresponding to those recipient users who reshared the shareable link, and reshare target identifiers corresponding to those user and/or group identifiers to which the shareable link was reshared. This way, user share network 314 can include target identifiers corresponding to a second level of the sharing user's share network.

In some embodiments, bookmark data structure 320 can be provided which stores information related to shareable links received and bookmarked by a recipient user. Online content management service 100 can maintain bookmark data structure 320 for each member, stored in the member's user account. When a request is received to bookmark a shareable link by a recipient user, an entry to the recipient user's bookmark data structure 320 can be added. The entry can include a copy of the shareable link URL 322, a user identifier 324 of the sharing user from whom the shareable link was received, and sortable metric 326. In some embodiments, sortable metric 326 can include metrics such as a view count and/or a label provided by the user. Multiple metrics can be stored for each shareable link. Online content management service 100 can provide a representation of bookmark data structure 320 to a client device for display. The client device can display the bookmarked links and enable the bookmarked links to be sorted according to sortable metric 326. In some embodiments, the representation can be a sharing graph that graphically represents relationships between the sharing users who created the bookmarked shareable links and the user associated with the bookmark data structure.

Figure 4:
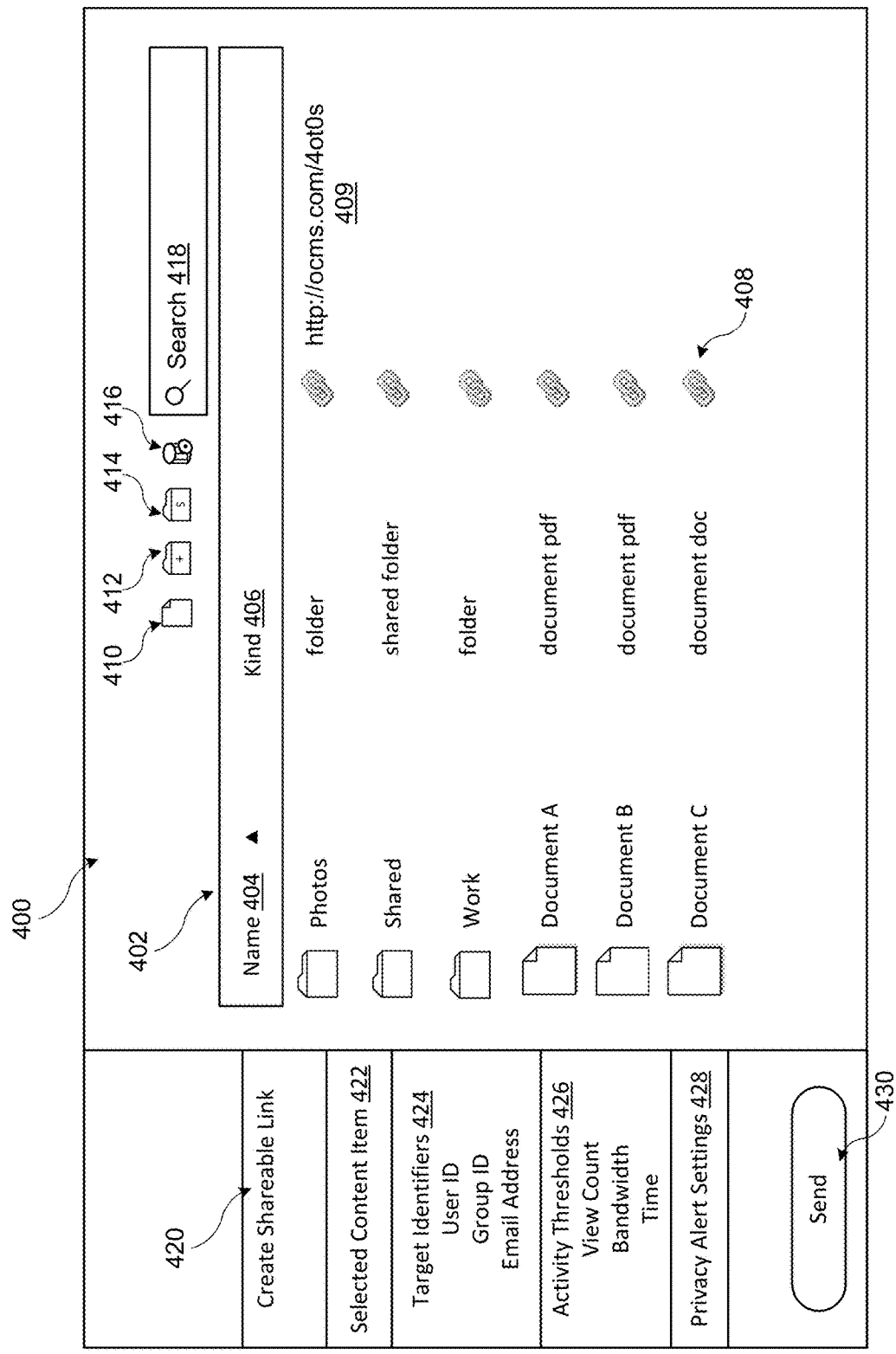
FIG. 4 shows an exemplary user interface through which shareable links can be requested, in accordance with an embodiment of the present invention.

FIG. 4 shows an exemplary user interface through which shareable links can be requested, in accordance with an embodiment of the present invention. As shown in FIG. 4, user interface 400 can be displayed on a client device and used to navigate and manage content items stored in online content management service 100. The user interface can display the user's content as shown at 402, which can be sorted according to one or more characteristics of the content items. For example, as shown in FIG. 4, folders and files are organized separately and are sorted by name 404. Alternatively, the content items can be sorted by kind 406. Each content item can be displayed with shareable link icon 408. User interface 400 can include selectable icons for content management operations, such as uploading new content items 410, creating a new folder 412, creating a new shared folder 414, and deleting content items 416. User interface 400 can include a search bar 418.

When shareable link icon 408 is selected for a particular content item, if a shareable link has already been created for that content item the shareable link URL can be displayed along with a selectable option to create a new shareable link. In some embodiments, if a shareable link has already been created for the content item, shareable link URL 409 can be displayed next to shareable link icon 408. If no shareable link has been created, or if the user selects to create a new shareable link, a create shareable link dialog 420 can be displayed. As shown in FIG. 4 create shareable link dialog 420 can be displayed as a sidebar. In some embodiments, create shareable link dialog 420 can be displayed as a pop-up window, overlay, or other graphical representation depending on the client device in use. Selected content item field 422 can display the name of the content item for which a shareable link will be created. For example, if a shareable link is being created for the folder Photos, selected content item field 422 will display "Photos". Target identifiers field 424 can include the identifiers of recipient users to whom the sharing user requests online content management service 100 send the shareable link. The target identifiers can include group and/or user identifiers for members of online content management service 100 and email addresses for non-members.

The sharing user can specify activity thresholds in activity thresholds field 426. The activity thresholds can include a maximum number of views, a bandwidth limitation, a temporal limitation, or other sharing limitations such as by geographic or political area, internet protocol (IP) address, or range of IP addresses. A bandwidth limitation can represent a maximum amount of data transferred of a period of time for a content item. Each time a content item is downloaded, the amount of data transferred from the online content management service increases. This can be tracked on a per content item basis such that if a bandwidth limit for a content item is reached, sharing of the content item can be disabled. In some embodiments, privacy alert settings field 428 can include user-configurable privacy settings. As described above, these settings can include an option to provide notice to recipient users that the shareable link is being monitored and/or an option to determine whether to report activity in aggregate or on a per request basis. Once the sharing user has completed filling out create shareable link dialog 420, the sharing user can select send 430 to create the shareable link for the content item and send the shareable link to target identifiers 424. In some embodiments, the sharing user can share the shareable link via communication channels other than online content management service 100, e.g., by copying and pasting shareable link URL 409 into an email, SMS, instant message, or other communications medium.

In some embodiments, after creating the shareable link, the sharing user can update the settings from those that were provided when the shareable link was created. For example, the sharing user can select a content item in user interface 400 for which a shareable link was previously created. The settings for the previously created shareable link can be shown, e.g., in dialog 420. This enables the sharing user to change the settings, such as adding new target identifiers or changing activity thresholds, without requiring the sharing user to create and share a new shareable link. Once the sharing user has made a change to the settings, send icon 430 can be replaced by an update icon that, when selected, dynamically changes the settings for the shareable link.

Figure 5:
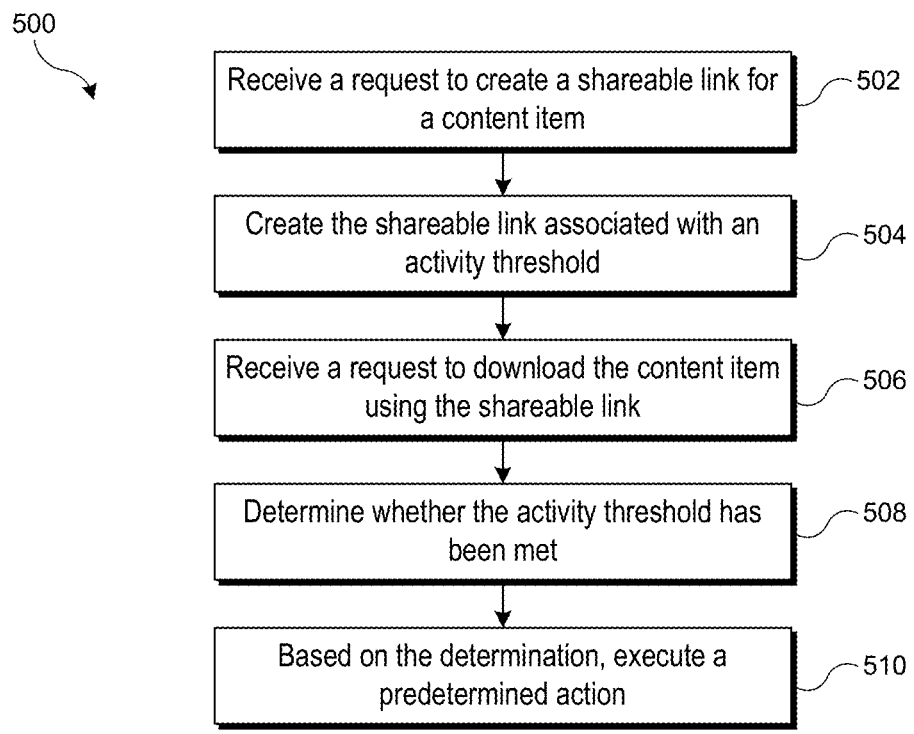
FIG. 5 shows a flow diagram of a process of monitoring activity associated with a shareable link and performing an action based on the activity, in accordance with an embodiment of the present invention.

As described above, in some embodiments online content management service 100 can monitor shareable link activity and perform an action based on that activity. This can include determining whether an activity threshold has been met and/or whether activity information can be reported, based on the shareable link's privacy settings. FIG. 5 shows a flow diagram of a process of monitoring activity associated with a shareable link and performing an action based on the activity, in accordance with an embodiment of the present invention. Process 500 can be implemented, e.g., on online content management service 100.

At block 502, online content management service 100 can receive a request to create a shareable link for a content item. As described above, the request can include privacy settings and activity thresholds which can set one or more activity thresholds for the shareable link, such as a maximum view count. At block 504, the shareable link is created and associated with the activity threshold. In some embodiments, when the shareable link is created, an entry is added to user share history 300 including the shareable link URL and activity threshold(s). At block 506, a request is received to download the content item using the shareable link. The request can be received from any user with a copy of the shareable link URL. At block 508, online content management service 100 can determine whether any activity threshold has been met based on user share history 300. At block 510, online content management service 100 can execute an action based on the determination. For example, activity thresholds 310 can include a privacy setting which requires a view count of five (or some other minimum number) before activity information is reported to the sharing user. Online content management service 100 can determine the view count using view metric 308 and, if the view count is greater than or equal to five, send activity information to the sharing user who created the shareable link. As another example, activity thresholds 310 can include a maximum view count. Online content management service 100 can determine whether the maximum view count has been reached using view metric 308 and allow or refuse access to the content item accordingly. This effectively deactivates the link, as subsequent requests will similarly be over the maximum view count.

In some embodiments, activity information can be summarized in a report that is sent and/or made available to the sharing user. The report can include a summary of requests to access the content item. The summary can include all requests that were successful (those requests where the requesting user successfully downloaded the content item). In some embodiments the summary can include unsuccessful attempts, where the download was canceled or interrupted. In some embodiments, the summary can include representations of data stored in user share history 300 associated with the shareable link.

For example, the summary can include representations of the view metrics, such as view count and CTR. In some embodiments, the view metrics can be shown relative to the activity thresholds and/or where appropriate the differences between the activity thresholds and the view metrics. For example, the report can indicate how many requests have been received for a particular content item and how many more can be received before an activity threshold is triggered. In some embodiments, all request data 313 collected for each request, including time and date stamps, location information, and user identifiers can be included in the report.

In some embodiments, online content management service 100 can identify different groups of requests to access a content item using a shareable link using data stored in request data field 313. When a user shares a shareable link, a first group of requests can be expected to be received from recipient users. After the first group of requests are received, it can be expected that activity subsides once the target users have obtained the content item. Depending on the users to whom the shareable link was sent, groupings of requests can be represented in one or more dimensions. For example, the first group can be temporally related, such that a difference between timestamps of different requests is less than a first threshold. The first group can also be geographically related, for example if a content item is shared with coworkers in the same office, or friends at a school. Geographically related groups of requests can be identified using geographic data, or IP address data, stored in request data field 313. Geographically related groups can also refer to groups of requests that originate from the same political area, such as nation, state, or province. The number of requests received to be classified as a group can be determined by the online content management service or configured by the sharing user.

In some embodiments, if a second group of requests is identified a notification can be sent to the sharing user who created and shared the shareable link. The second group of requests can be identified similarly to the first group, based on temporal or geographic commonalties. The notification can inform the sharing user that a second group of requests has been received and include details about the group, such as the common geographic location or time when the requests were received. Each group can be identified as being distinct where, e.g., a difference between a timestamp corresponding to the last request in the first group and a timestamp corresponding to the first request in the second group is greater than a second threshold. A distance threshold can be used to identify geographically distinct groups. This can alert the sharing user that the shareable link has been shared improperly, and may be being accessed by unintended users. For example, if the second group of requests is received much later than the first, or from a foreign country, the alert gives the sharing user the opportunity to determine whether to disable the link.

As described above, online content management service 100 can monitor how many requests are received using a particular shareable link, and can store that information in user share history 300 as a view count. By comparing the view counts of shareable links in a user's user share history 300, online content management service 100 can identify relatively popular shared content items, e.g., those associated with shareable links receiving higher numbers of requests, and relatively unpopular shared content items.

Figure 6:
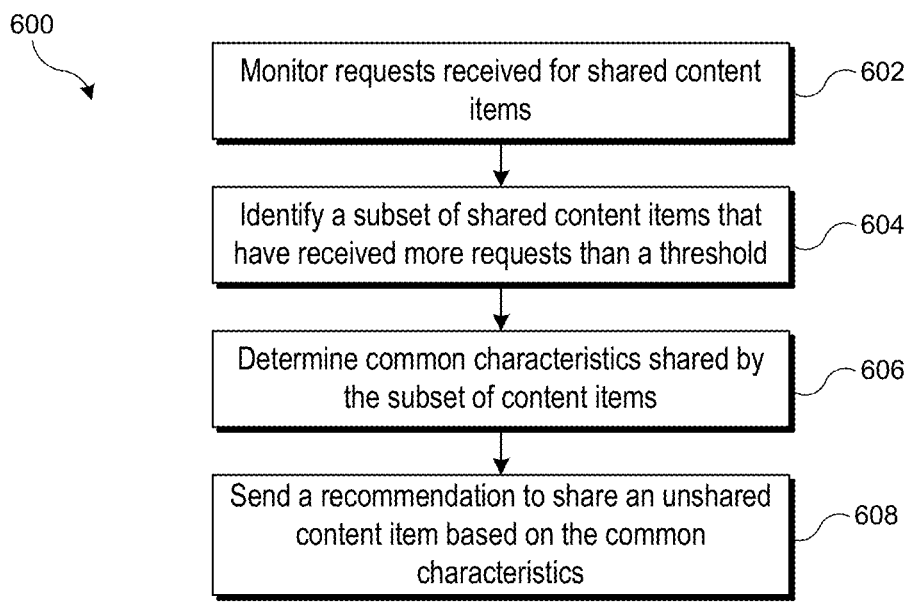
FIG. 6 shows a flow diagram of a process of generating a sharing recommendation for an unshared content item, in accordance with an embodiment of the invention.

Using this information, online content management service 100 can generate recommendations for sharing unshared content items having similar characteristics to a user's more popular shared content items. FIG. 6 shows a flow diagram of a process 600 of generating a sharing recommendation for an unshared content item, in accordance with an embodiment of the invention. Process 600 can be implemented, e.g., on online content management service 100.

At block 602, online content management service 100 can monitor requests received from recipient users via shareable links. As described above, this can include incrementing a view count each time a request for a content item is received using a shareable link. The view count can be stored in a user's share history 300. At block 604, online content management service 100 can identify a subset of shared content items associated with shareable links that have received more requests than a threshold value. In some embodiments, this threshold value can be set by online content management service 100, while in other embodiments this threshold value can be made user-configurable. This threshold can be independent of other thresholds described herein, such as the threshold limit for reporting statistics described above. The threshold value can be used to identify which shared content items are popular, for the purposes of creating a recommendation. At block 606, common characteristics of each content item in the subset of shared content items can be determined. These characteristics can include content item name and content item metadata such as authorship, creation time/date, location information, keywords or tags or other content descriptors, and any other metadata that is available. In some embodiments, the contents of particular content items can be analyzed, depending on user privacy settings. If content analysis is enabled, for example if a content item is marked analyzable, then online content management service 100 can determine the content item's type and further analyze the contents of the content item. In some embodiments, public items can automatically be marked analyzable and private items can automatically not be marked analyzable. In some embodiments, a content item can be marked analyzable independent of whether the content item is public or private. For example, if a popular shared content item is identified as an image, then it can be analyzed to identify faces of people in the image. Unshared content items can be similarly analyzed to identify whether they include faces in common with the popular shared content item. Similarly, location information and creation time/date information can be used to identify unshared content items that were related to and/or created concurrently with the popular content item.

At block 608, a recommendation is sent to the user to share an unshared content item based on the common characteristics. In some embodiments, the recommendation can include particular target identifiers with whom it is recommended to share the unshared content item. Online content management service 100 can identify the different subsets of users, e.g., using user share history 300 and/or user share network 314, who have viewed, and/or have received links to view, particular content items, and associate the subsets with particular characteristics of content items. Online content management service 100 can then tailor recommendations for unshared content items to the subsets based on identified characteristics of the content items. For example, a work presentation content item may be downloaded by one subset of target identifiers corresponding to coworkers. Work-related content items stored in online content management service 100 can share particular common characteristics including, but not limited to, file naming convention, folder name, creation time/date, location information, keywords or tags or other content descriptors. The subset of target identifiers with whom work-related content items are commonly shared, based on the user share history, can be automatically associated with the particular work-related content item characteristics. Online content management service 100 can then identify similar content items and recommend that they be shared with the subset of target identifiers corresponding to coworkers. Similarly, a vacation image content item may be downloaded by a different subset of target identifiers corresponding to friends and family. Online content management service 100 can identify similar content items based on common characteristics, such as other vacation images, and recommend sharing them with friends and family.

Figure 7:
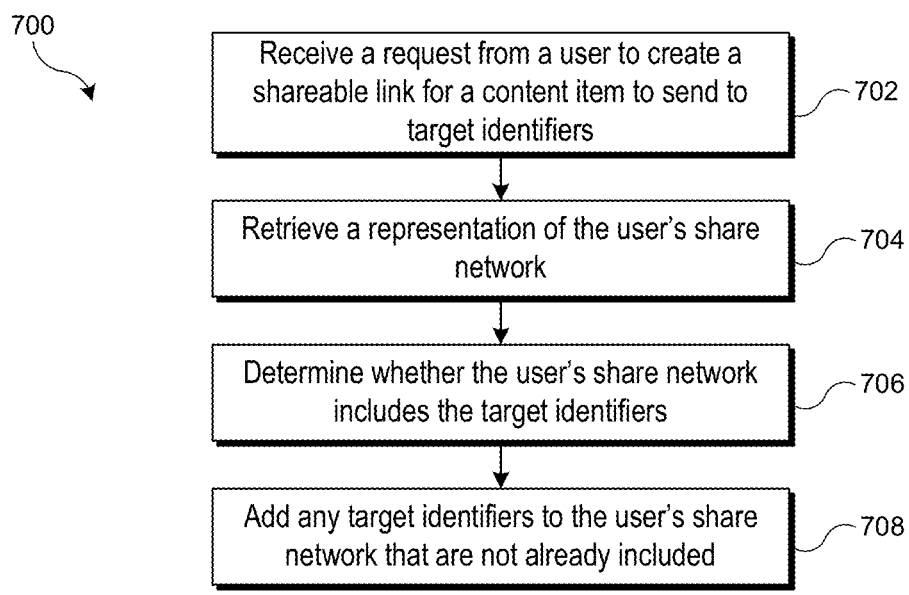
FIG. 7 shows a flow diagram of a process of adding target identifiers to a user's share network, in accordance with an embodiment of the present invention.

As described above, online content management service 100 can tailor recommendations to subsets of target identifiers based on user share network 314. User share network 314 can also be used as a security feature to confirm that shareable links are sent to intended target identifiers, as is discussed further below. As such, maintaining user share networks can improve recommendation and security features provided by online content management service 100. FIG. 7 shows a flow diagram of a process of adding target identifiers to a user's share network, in accordance with an embodiment of the present invention. Process 700 can be implemented, e.g., on online content management service 100.

At block 702, online content management service 100 can receive a request to create a shareable link for a content item. As described above, the request can include target identifiers to which the shareable link is to be sent by online content management service 100. At block 704, user share network 314 can be retrieved and at block 706, the target identifiers included in the request can be compared to those in user share network 314. In some embodiments, a notification can be sent if any of the target identifiers are not listed in user share network 314. This can help avoid accidentally sending a shareable link to an unintended recipient. In some embodiments, online content management service 100 can require user authentication, e.g., input of a password, token, or other authentication mechanism, before sending a shareable link to a target identifier not included in user share network 314. At block 708, user share network 314 can be updated to include any target identifiers that were not previously included. In some embodiments, when a user shares a first content item, similar content items can be identified based on the common characteristics and a recommendation to share the similar content items with a subset of target identifiers associated with the common characteristics can be generated and sent to the user.

In some embodiments, advertisements can be served when a recipient user requests to download a content item using a shareable link, such as on a download page or other web page or within an application. The advertisements can be priced based on past and current activity on the sharing user's shareable links. This enables online content management service 100, e.g., to serve higher value advertisements for links shared by users who have a history of sharing relatively popular links. The advertisements served, and the advertising rate of those advertisements, can vary dynamically based on the monitored activity of the shareable link. The advertising rate can correspond to the amount an advertiser pays when an advertisement is displayed and/or when a user responds to the displayed advertisement, e.g., by selecting the advertisement to obtain additional information. In some embodiments, a click through rate (CTR) can be associated with each user based on how often advertisements served with the user's shareable links are clicked. Users with a history of higher CTRs can have higher value advertisements served with their shareable links.

Figure 8:
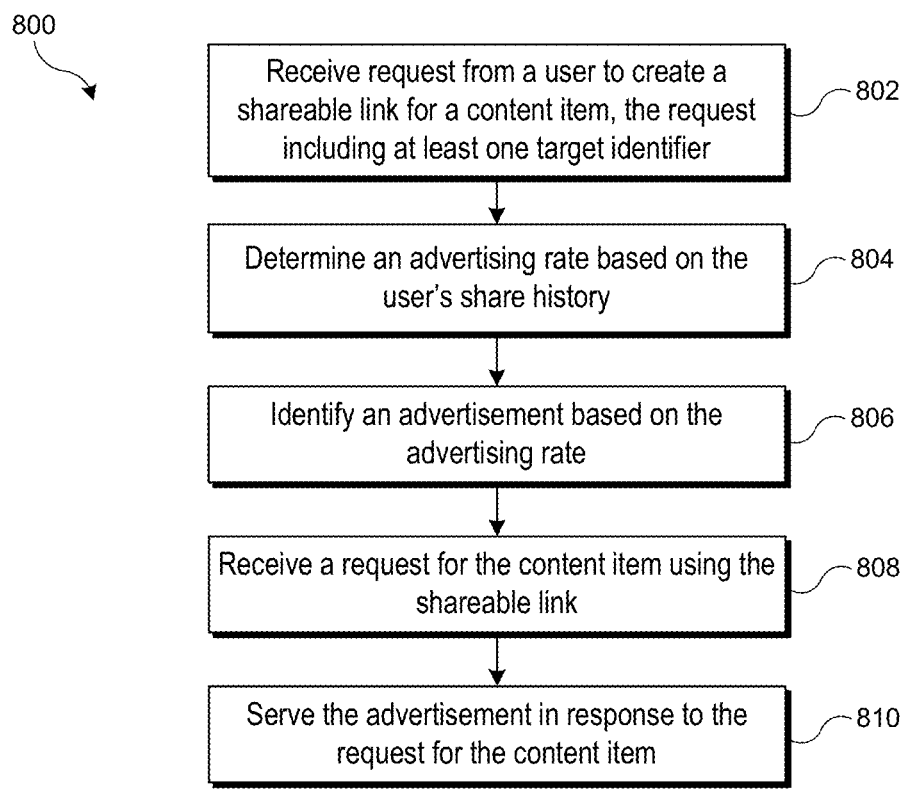
FIG. 8 shows a flow diagram of a process of serving advertisements based on a user's share history, in accordance with an embodiment of the present invention.

FIG. 8 shows a flow diagram of a process of serving advertisements based on a user's share history, in accordance with an embodiment of the present invention. Process 800 can be implemented, e.g., on online content management service 100.

At block 802, online content management service 100 can receive a request to create a shareable link from a user. As described above, the request can include one or more target identifiers to which the shareable link is to be sent. At block 804, an advertising rate can be determined based on the user's user share history 300. An advertising rate schedule can be used to determine the advertising rate for the shareable link based on user share history 300. Online content management service can analyze user share history 300 to determine how many shareable links the sharing user has created and an average number of requests received using each shareable link. An appropriate rate can be selected from the advertising rate schedule based on the sharing user's average requests per shareable link. Additionally, or alternatively, user share history 300 can be used to determine a type associated with the content item. The advertising schedule can specify different advertising rates for each type of content item. In some embodiments, user share history 300 can be used to determine for each content item type, how many shareable links have been created and an average number of requests per shareable link. The advertising rate schedule can include different advertising rates for each content item type, and rates can be assigned based on the average request per shareable link for each content item type.

At block 806, online content management service 100 can identify an advertisement based on the advertising rate. In some embodiments, a specific advertisement having the determined advertising rate can be selected based on information about the content item, such as the content item's name and the content item's content. For example, if a shareable link is created for a folder entitled "Vacation Photos," advertisements for vacations or vacation-related products can be selected. At block 808, a request is received for the content item using the shareable link. At block 810, the identified advertisement is served along with the content item in response to the request.

Figure 9:
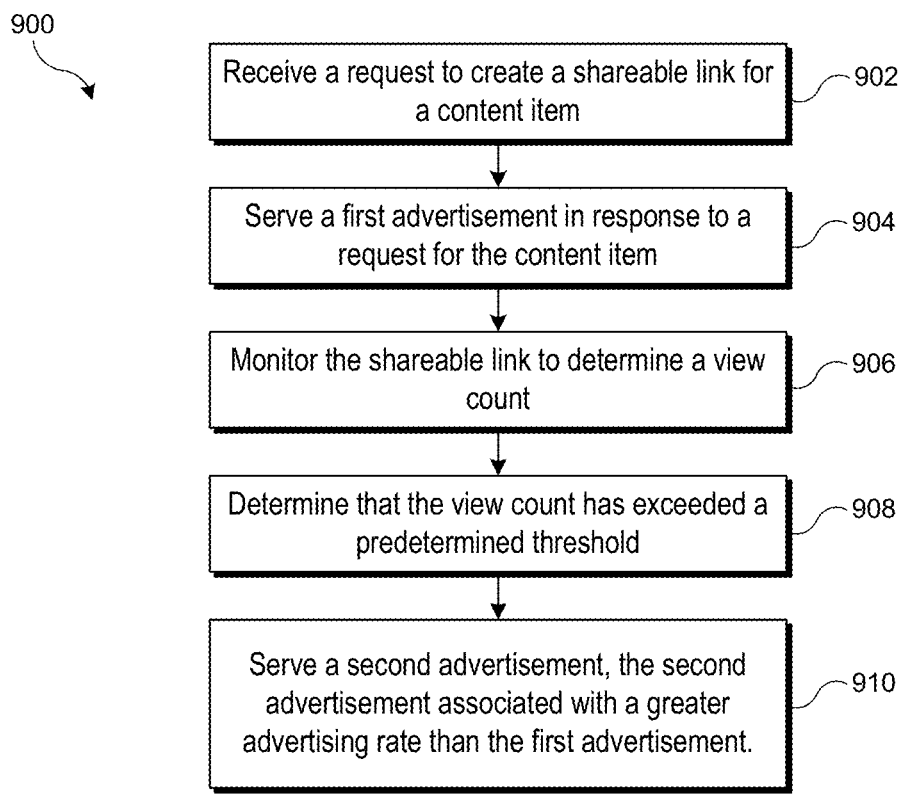
FIG. 9 shows a flow diagram of a process of varying advertising rates of advertisements associated with a user's shareable links based on shareable link activity, in accordance with an embodiment of the invention.

Requests received for a content item using a shareable link can exceed or underperform estimates based on a user's share history. Where monitored activity on a particular shareable link does not match the initial advertising rate, a new advertising rate can be determined and a new advertisement served. FIG. 9 shows a flow diagram of a process of varying advertising rates of advertisements associated with a user's shareable links based on shareable link activity, in accordance with an embodiment of the invention. Process 900 can be implemented, e.g., on online content management service 100.

At block 902, a request is received to create a shareable link for a content item. At block 904, a first advertisement is served in response to a request for the content item using the shareable link. The first advertisement can be selected using, e.g., process 800 described above. At block 906, activity on the shareable link can be monitored and a view count determined. As described above, the view count can be stored in user share history 300 in an entry corresponding to the shareable link. At block 908, online content management service 100 can determine that the view count has exceeded a threshold. In some embodiments, this determination can be made each time a request is received using the shareable link. At block 910, in response to the determination a second advertisement having a higher advertising rate can be selected and served in response to subsequent requests. In some embodiments, if no requests have been received in a period of time, a lower advertisement rate can be associated with the shareable link. This enables advertising rates to vary over time based on the shareable link's activity.

It will be appreciated that processes 500, 600, 700, 800, and 900 are illustrative and that variations and modifications are possible. Steps described as sequential can be executed in parallel, order of steps can be varied, and steps can be modified, combined, added or omitted. Used together, processes 500, 600, 700, 800, and 900 (or similar processes) can allow users to create and share shareable links for content items and enable online content management service 100 to monitor requests received using the shareable links and execute actions based thereon.

While the invention has been described with respect to specific embodiments, one skilled in the art will recognize that numerous modifications are possible. For example, the particular events, data structures, and platforms described herein are used for purposes of illustration; other events, data structures, and platforms can be substituted. Techniques for creating and sharing shareable links, as well as monitoring and executing actions based on requests received for those shareable links, can also be modified as appropriate for a particular client.

Embodiments described above can make reference to data structures and databases or data stores. It is to be understood that these terms can encompass any techniques for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
monitoring a plurality of requests for a plurality of shared content items, each shared content item, of the plurality of shared content items, corresponding to a different shareable link, of a plurality of shareable links;
wherein each request, of the plurality of requests, is for one shared content item, of the plurality of shared content items, and specifies the shareable link, of the plurality of shareable links, corresponding to the shared content item;
wherein monitoring the plurality of requests for the plurality of shared content items comprises, for each request, of the plurality of requests, incrementing a counter associated with the shareable link specified in the each request;
based on the counters associated with the plurality of shareable links, identifying a subset of one or more shared content items, of the plurality of shared content items, with a number of received requests via shareable links exceeding a threshold;
identifying, from a share history of a user, a group of target identifiers with which the subset of one or more shared content items have been shared by the user;
determining, via a processor, one or more common characteristics common among the subset of one or more shared content items;
identifying an unshared content item having the one or more common characteristics;
sending a recommendation to the user, the recommendation recommending that the user create a shareable link for the unshared content item and recommending that the user share the shareable link for the unshared content item with the group of target identifiers; and
wherein the method is performed by one or more computer systems comprising one or more processing units.

2. The method of claim 1, wherein the one or more common characteristics include content item name and content item metadata.

3. The method of claim 1, further comprising:
determining whether the unshared content item is analyzable; and
upon determining that the unshared content item is analyzable, analyzing contents of the unshared content item,
generating the recommendation based on the analyzed contents of the unshared content item, and
sending a sharing recommendation for the unshared content item.

4. The method of claim 3, further comprising:
upon determining that the unshared content item is analyzable, analyzing metadata of the unshared content item to determine one or more of authorship and publication information of the unshared content item.

5. The method of claim 1, further comprising:
creating the shareable link for the content item; and
storing the shareable link and the recommendation in a user share history data structure.

6. The method of claim 1, wherein the threshold includes one or more of:
a view count corresponding to a number of times a content item is requested using requested using the shareable links;
a content item-specific network bandwidth limit; or
a network communication protocol limitation.

7. A computer-implemented method comprising:
receiving, from a first client device, a request to create a shareable link to a first content item, wherein the request comprises a particular target identifier of a user or a group of users to which the shareable link is to be provided;
responsive to receiving the request, accessing a first data structure representing a share group of users, wherein the first data structure includes a plurality of target identifiers;
responsive to receiving the request, determining whether the plurality of target identifiers in the first data structure comprises the particular target identifier of the request;
adding the particular target identifier of the request to the first data structure upon determining that the plurality of target identifiers in the first data structure does not include the particular target identifier of the request;
identifying a second content item that has at least one characteristic in common with the first content item;
identifying a subset of the plurality of target identifiers in the first data structure with which content items that include the at least one common characteristic have previously been shared, the subset of the plurality of target identifiers comprising the particular target identifier;
sending a recommendation to the first client device to create and share a shareable link to the second content item with the subset of the plurality of target identifiers in the first data structure; and
wherein the method is performed by one or more computer systems comprising one or more processing units.

8. The method of claim 7, wherein the second content item is an unshared content item that has not been shared with any user in the share group of users.

9. The method of claim 7, further comprising:
upon determining that the particular target identifier is not included in the first data structure, sending a notification to the first client device to confirm adding the particular target identifier to the share group of users.

10. The method of claim 7, further comprising:
retrieving additional data structures, wherein each additional data structure represents a share group of users associated with a target identifier of the plurality of target identifiers in the first data structure;
determining whether any of the additional data structures include the particular target identifier; and
upon determining that the particular target identifier is not included in either of the first data structure or the additional data structures, sending a notification to the first client device to confirm adding the particular target identifier to the share group of users.

11. The method of claim 7, further comprising:
receiving, from a second client device, a request from a recipient user associated with particular target identifier to bookmark the shareable link; and
adding an entry to a bookmark data structure associated with an account of the recipient user, the account corresponding to the shareable link, wherein the entry includes the shareable link and at least one sortable metric.

12. The method of claim 11, further comprising:
sending a representation of the bookmark data structure to the second client device for display; and
sorting the representation according to the sortable metric, wherein the sortable metric includes one or more of a view count associated with the shareable link and a user configurable metric indicating an importance of the shareable link.

13. The method of claim 12 wherein the representation is a sharing graph.

14. A system comprising:
an online content management service executing on at least one server including:
a computer readable medium, and
a processor;
wherein the online content management service is configured to:
store a plurality of content items in a plurality of user accounts;
maintain a data structure representing share group of users, the shared group of users including one or more users with whom content is shareable, wherein the share group of users is associated with each of the plurality of user accounts, and wherein the data structure includes one or more target identifiers, each of the one or more target identifiers associated with a different user of the one or more users in the share group of users;
receive, from a client device, a request to create a shareable link for a user to access a first content item stored in a user account of the plurality of user accounts, wherein the request includes at least one target identifier associated with the user;
access the data structure representing the share group of users associated with the user account;
upon determining that the one or more target identifiers in the data structure does not include the at least one target identifier, update the data structure to add the at least one target identifier;
identify a second content item that includes at least one common characteristic with the first content item;
identifying a subset of the one or more target identifiers in the data structure with which content items that include the at least one common characteristic have previously been shared, the subset of the one or more target identifiers comprising the at least one target identifier; and
send a recommendation to the client device to create and share a shareable link to the second content item with a subset of the one or more target identifiers in the data structure.

15. The system of claim 14, wherein the second content item is an unshared content item stored in the user account.

16. The system of claim 14, wherein the online content management service is further configured to:
upon determining that the one or more target identifiers in the data structure does not include the at least one target identifier, send a notification to the client device to confirm the at least one target identifier.

* * * * *